(12) United States Patent
Shah et al.

(10) Patent No.: US 12,556,883 B2
(45) Date of Patent: Feb. 17, 2026

(54) METHOD AND SYSTEM FOR UPDATING LOCATION-BASED GROUP IN V2X NETWORK

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 17/846,223

(22) Filed: Jun. 22, 2022

(65) Prior Publication Data
US 2022/0408223 A1 Dec. 22, 2022

(30) Foreign Application Priority Data

Jun. 22, 2021 (IN) .............................. 202141028022
Jun. 6, 2022 (IN) .............................. 2021 41028022

(51) Int. Cl.
*H04W 4/02* (2018.01)
*H04W 4/021* (2018.01)
(Continued)

(52) U.S. Cl.
CPC ........... *H04W 4/029* (2018.02); *H04W 4/021* (2013.01); *H04W 4/40* (2018.02); *H04W 8/186* (2013.01)

(58) Field of Classification Search
CPC ....... H04W 4/029; H04W 4/40; H04W 4/021; H04W 8/186
See application file for complete search history.

(56) References Cited

U.S. PATENT DOCUMENTS

2006/0152374 A1* 7/2006 Singer ..................... G07C 9/28
340/573.4
2018/0184255 A1* 6/2018 Marson ................. H04W 12/64
(Continued)

FOREIGN PATENT DOCUMENTS

JP 2005341113 A * 12/2005
WO 2020/101388 A1 5/2020

OTHER PUBLICATIONS

3GPP; TSG SA; Service Enabler Architecture Layer for Verticals (SEAL); Functional architecture and information lows; (Release 17)', 3GPP TS 23.434 V17.1.0, Apr. 2, 2021.
(Continued)

*Primary Examiner* — Junpeng Chen
(74) *Attorney, Agent, or Firm* — Jefferson IP Law, LLP

(57) ABSTRACT

A system and method for updating location-based group in network by location management server are provided. The method includes receiving a location area monitoring subscription request from vertical application layer (VAL) server to subscribe for notification for at least one vehicle-to-everything (V2X) user equipment (UE) moving in or moving out of a specific location area associated with a group, sending a location area monitoring subscription response to the VAL server in response to successful authorization of the VAL server, detecting at least one V2X UE moving in or moving out of the specific location area associated with the group based on the subscription, and sending a location area monitoring notification to the VAL server including the triggering event and information about the at least one V2X UE moving in or moving out of specific location area associated with group.

16 Claims, 11 Drawing Sheets

(51) Int. Cl.
*H04W 4/029* (2018.01)
*H04W 4/40* (2018.01)
*H04W 8/18* (2009.01)

(56) References Cited

U.S. PATENT DOCUMENTS

| | | | |
|---|---|---|---|
| 2019/0087925 A1* | 3/2019 | Stortstrom | G06F 18/22 |
| 2020/0137712 A1* | 4/2020 | Yu | G01S 13/765 |
| 2020/0178052 A1* | 6/2020 | Pattan | H04L 41/5058 |
| 2021/0306382 A1* | 9/2021 | Shah | H04L 65/1104 |
| 2022/0224401 A1* | 7/2022 | Zhao | H04W 76/19 |
| 2022/0292946 A1* | 9/2022 | Yamamoto | G01S 5/02 |
| 2022/0350010 A1* | 11/2022 | Sagi | G01S 13/04 |
| 2022/0377503 A1* | 11/2022 | Zhao | G08G 5/0026 |

OTHER PUBLICATIONS

3GPP; TSG SA; Procedures for the 5G System (5GS); Stage 2 (Release 17)', 3GPP TS 23.502 V17.0.0, Mar. 31, 2021.
Samsung et al., 'SEAL Location Deviation Service', S6-211318, 3GPP TSG-SA WG6 Meeting #43, emeeting, May 19, 2021.
Samsung, 'Seal enable 5G Cn capabilties for SEAL groups', S6-211484, 3GPP TSG-SA WG6 Meeting #43, emeeting, Jun. 6, 2021.
International Search Report dated Oct. 13, 2022, issued in International Patent Application No. PCT/KR2022/008890.

* cited by examiner

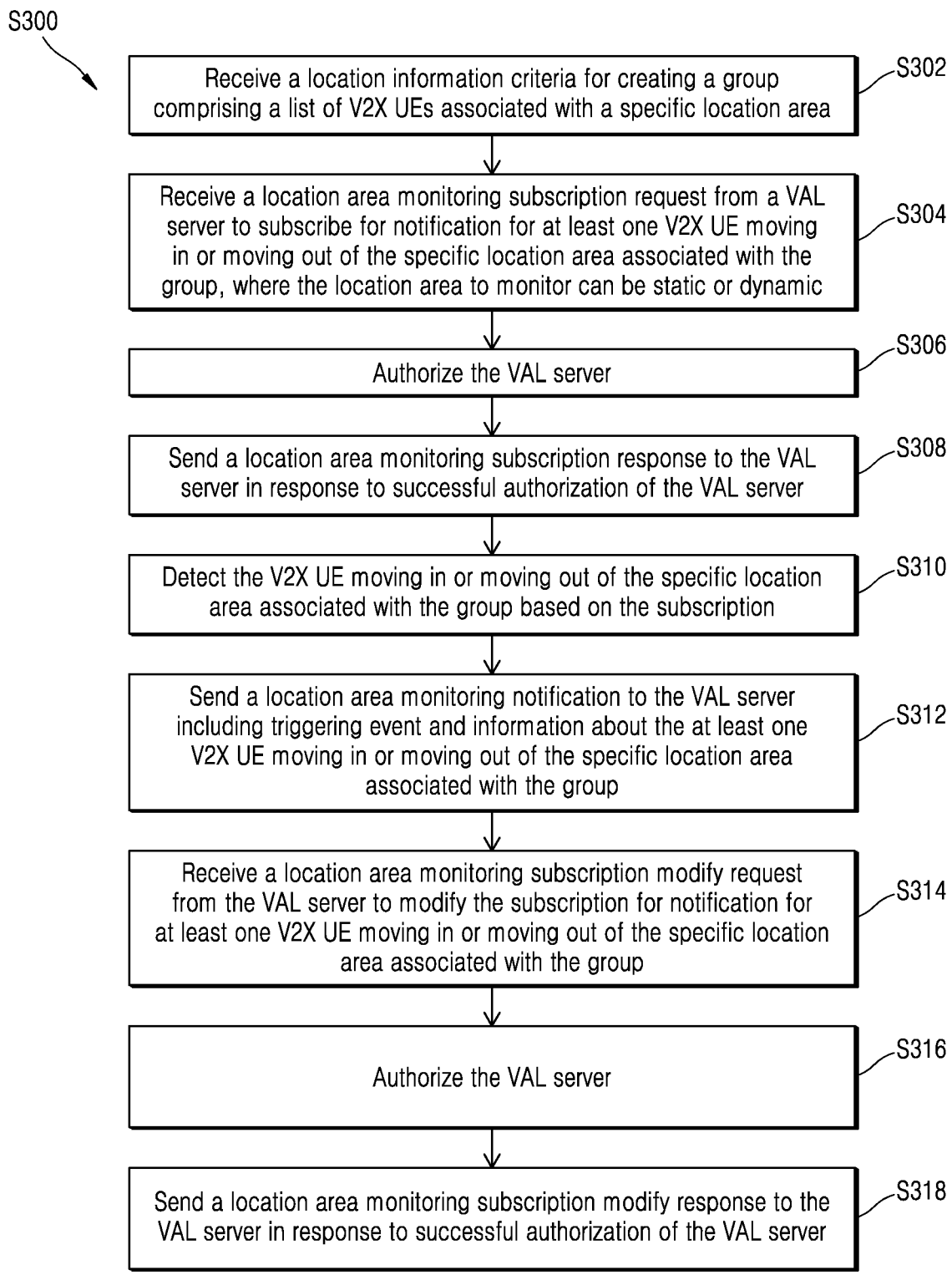

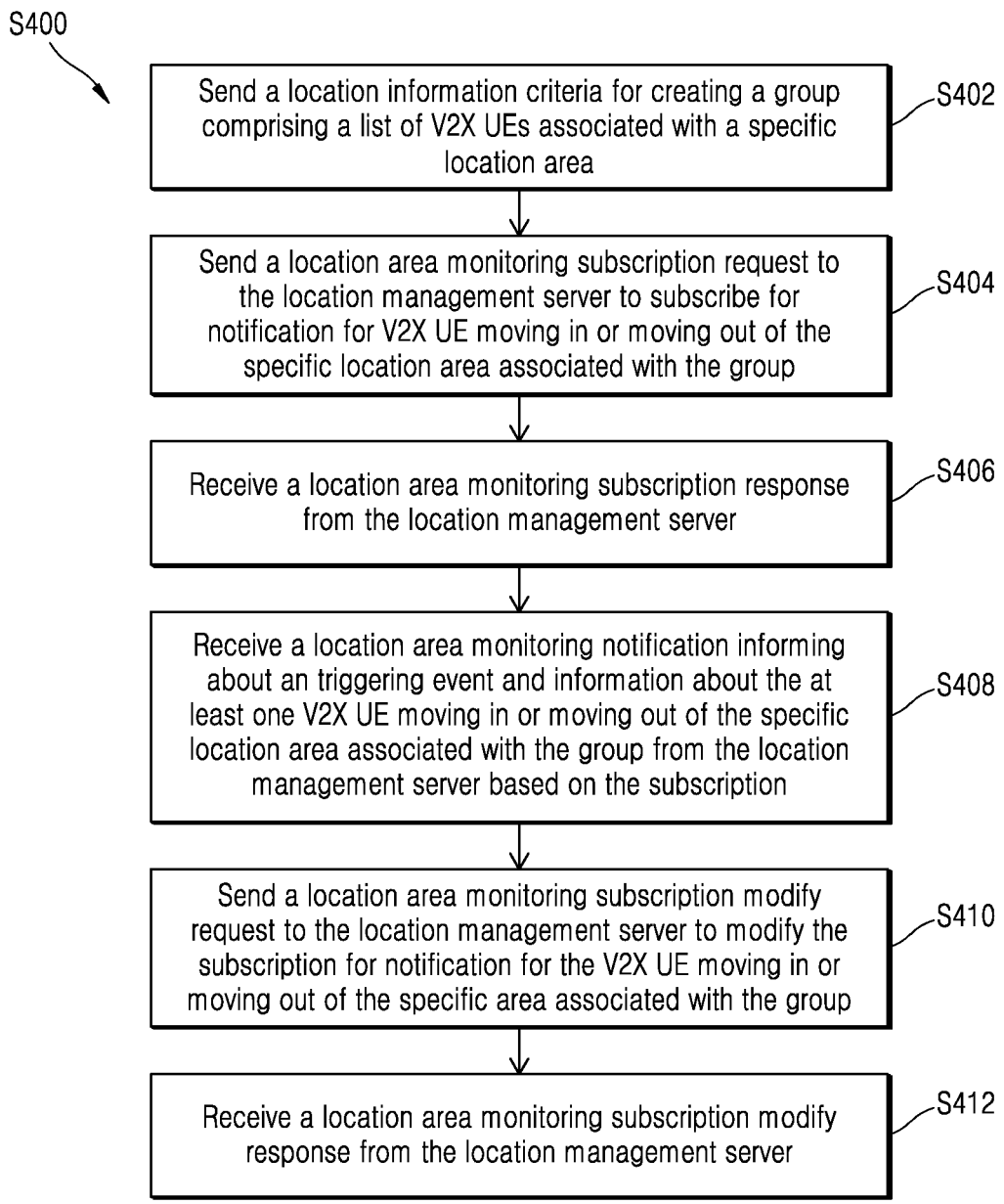

METHOD AND SYSTEM FOR UPDATING LOCATION-BASED GROUP IN V2X NETWORK

CROSS-REFERENCE TO RELATED APPLICATION(S)

This application is based on and claims priority under 35 U.S.C. § 119(a) of an Indian Provisional patent application number 202141028022, filed on Jun. 22, 2021, in the Indian Patent Office, and of an Indian Complete patent application number 202141028022, filed on Jun. 6, 2022, in the Indian Patent Office, the disclosure of each of which is incorporated by reference herein in its entirety.

BACKGROUND

1. Field

The disclosure relates to a Vehicle-to-everything (V2X) network. More particularly, the disclosure relates to a system and method for updating a location-based group in the V2X network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (millimeter wave (mmWave)) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for updating location-based group in network by location management server.

Additional aspects will be set forth in part in the description which follows and, in part, will be apparent from the description, or may be learned by practice of the presented embodiments.

In accordance with an aspect of the disclosure, a method for updating location-based group in network by location management server is provided. The method includes receiving a location area monitoring subscription request from Vertical Application Layer (VAL) server to subscribe for notification for at least one V2X User Equipment (UE) moving in or moving out of the specific location area associated with the group. Further, the method includes sending a location area monitoring subscription response to the VAL server in response to successful authorization of the VAL server. Further, the method includes detecting at least one V2X UE moving in or moving out of the specific location area associated with the group based on the subscription. Further, the method includes sending a location area monitoring notification to the VAL server including the triggering event and information about the at least one V2X UE moving in or moving out of specific location area associated with group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a flow chart illustrating a method, implemented by the location management server, for updating location-based group in the V2X network, according to an embodiment of the disclosure;

FIG. 4 illustrates a flow chart illustrating a method, implemented by the VAL server, for updating location-based group in the V2X network, according to an embodiment of the disclosure;

Throughout the drawings, it should be noted that like reference numbers are used to depict the same or similar elements, features, and structures.

DETAILED DESCRIPTION

Figure 1:
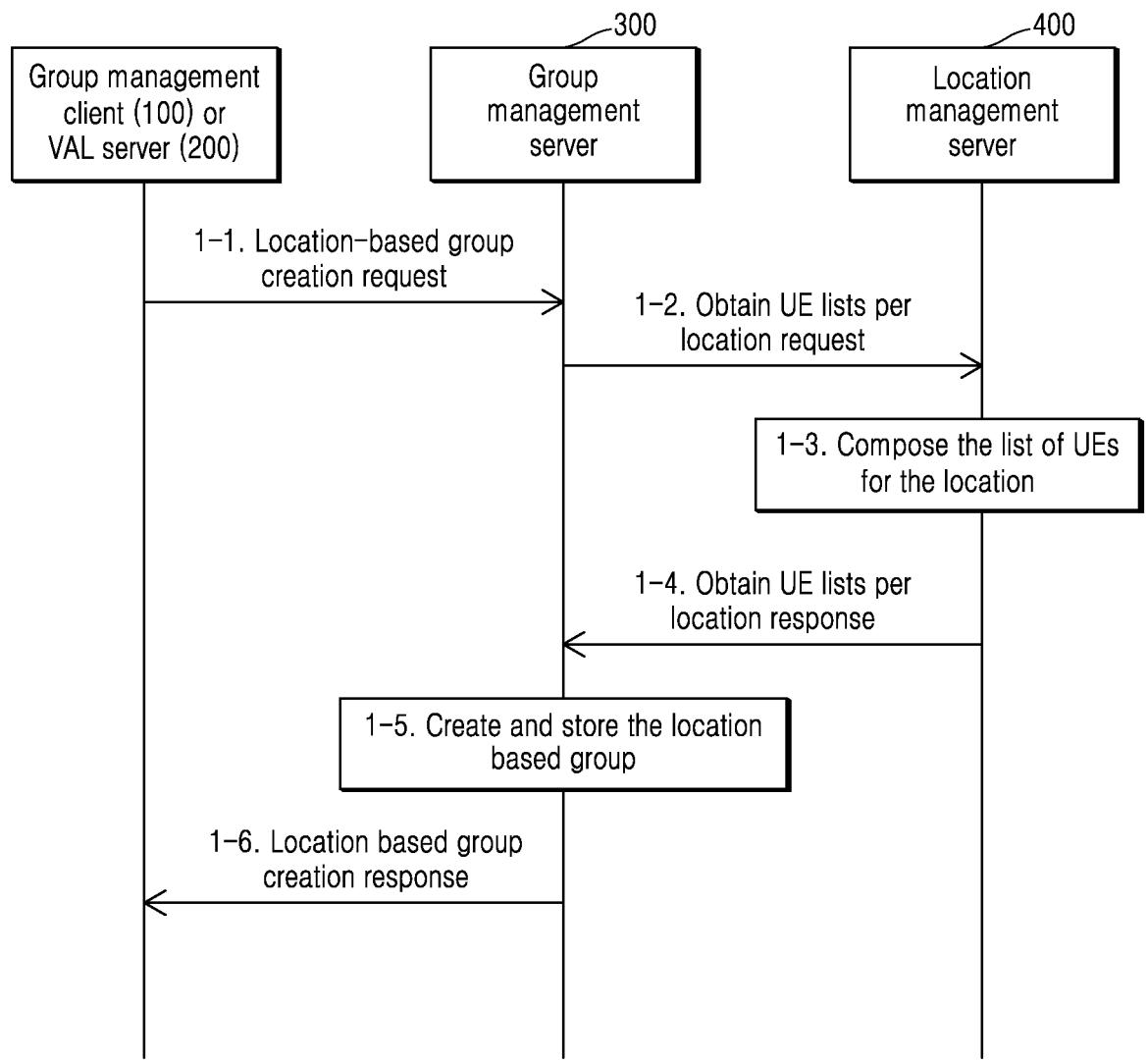
FIG. 1 illustrates location based group creation according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, Descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

According to an embodiment of the disclosure, a method for updating location-based group in a V2X network is provided. The method includes receiving, by a location management server, a location information criteria for creating a group comprising a list of V2X User Equipment's (UEs) associated with a specific location area. Further, the method includes receiving, by the location management server, a location area monitoring subscription request from a Vertical Application Layer (VAL) server to subscribe for notification for at least one V2X UE moving in or moving out of the specific location area associated with the group, where the location area to monitor can be static or dynamic. Further, the method includes authorizing, by the location management server, the VAL server. Further, the method includes sending, by the location management server, a location area monitoring subscription response to the VAL server in response to successful authorization of the VAL server. Further, the method includes detecting, by the location management server, at least one V2X UE moving in or moving out of the specific location area associated with the group based on the subscription. Further, the method includes sending, by the location management server, a location area monitoring notification to the VAL server including the triggering event and information about the at least one V2X UE moving in or moving out of the specific location area associated with the group.

In one embodiment, sending, by the location management server, the location area monitoring notification to the VAL server comprises: detecting, by the location management server, a triggering event based on at least one of a predefined time period and a distance travelled by the at least one V2X UE, wherein the triggering event indicates one of a time since last report, distance travelled by the reference UE, an age of the location information stored at the location management server or moving in or moving out of the at least one V2X UE of the specific location area, based on a current location data and time stamp of the location of the at least one V2X UE, and sending, by the location management server, the location area monitoring notification to the VAL server based on detection of the triggering event.

In one embodiment, the location information criteria comprise at least one of geographic location information of the specified location and a reference UE information wherein the UEs moving in or moving out to be monitored. The reference UE information comprises identity of the UE, location of the UE and the proximity range from the reference UE within which the UEs moving in or moving out to be monitored, where the location area to monitor is static or dynamic.

In one embodiment, the location area monitoring subscription request comprises an identity of the VAL server requesting for the subscription, information of the specific location area be monitored, a time between consecutive reports, an immediate report indicator, and triggering events identifying when the VAL server sends the notification related to at least one of a distance travelled by the at least one V2X UE and an age of the specific location area.

In one embodiment, the information of the specific location area comprises at least one of geographic location information of the specified location and a reference UE information wherein the UEs moving in or moving out to be monitored, and wherein the reference UE information comprises identity of the UE, location of the UE and the proximity range from the reference UE within which the UEs moving in or moving out to be monitored. The reference UE can be static or moving.

In one embodiment, the location area monitoring subscription response comprises a subscription status and a subscription identity.

In one embodiment, the location area monitoring notification response comprises a subscription identity, a list of identities of all V2X UEs who are currently present in the specified location area associated with the group, a list of V2X UEs either moved in to the specified location area or moved out of the specified location area associated with the group, a list of identities of the V2X UEs who moved in to the specified location area since previous location area monitoring notification, a list of identities of the V2X UEs who moved out of the specified location area since previous location area monitoring notification, and the triggering event.

In one embodiment, the method further comprises: receiving, by the location management server, a location area monitoring subscription modify request from the VAL server to modify the subscription for notification for at least one V2X UE moving in or moving out of the specific location area associated with the group; authorizing, by the location management server, the VAL server; sending, by the location management server, a location area monitoring subscription modify response to the VAL server in response to successful authorization of the VAL server; detecting, by the location management server, an triggering event indicating one of moving in or moving out of the at least one V2X UE of the specific location area based on the modified subscription; and sending, by the location management server, a location area monitoring notification informing about the triggering event to the VAL server.

In one embodiment, the location area monitoring subscription modify request comprises an identity of the VAL server requesting for the subscription, information of the specific location area be monitored, a time between consecutive reports, an immediate report Indicator, and triggering events identifying when the VAL server sends the notification related to at least one of a time since last report, distance travelled by the at least one V2X UE, an age of the specific location information and moving in or moving out of the at least one V2X UE of the specific location area associated with the group.

In one embodiment, the location area monitoring subscription modify response comprises a subscription status and a subscription identity.

According to another embodiment of the disclosure, a method for updating location-based group in a V2X network is provided. The method comprises: sending, by a VAL server, a location information criteria for creating a group comprising a list of V2X UEs associated with a specific location area; sending, by the VAL server, a location area monitoring subscription request to the location management server to subscribe for notification for at least one V2X UE moving in or moving out of the specific location area associated with the group, where the location area to monitor can be static or dynamic; receiving, by the VAL server, a location area monitoring subscription response from the location management server; and receiving, by the VAL server, a location area monitoring notification informing about a triggering event from the location management server based on the subscription, wherein the triggering event indicates one of moving in or moving out of the at least one V2X UE of the specific location area associated with the group.

In one embodiment, the location information criteria comprise at least one of geographic location information of the specified location and a reference UE information, wherein the UEs moving in or moving out to be monitored, and wherein the reference UE information comprises identity of the UE, location of the UE and the proximity range from the reference UE within which the UEs moving in or moving out to be monitored, where the location area to monitor is static or dynamic.

In one embodiment, the location area monitoring subscription request comprises an identity of the VAL server requesting for the subscription, information of the specific location area be monitored, a time between consecutive reports, an immediate report indicator, and triggering events identifying when the VAL server sends the notification related to at least one of a distance travelled by the at least one V2X UE and an age of the specific location area associated with the group.

In one embodiment, the information of the specific location area comprises at least one of geographic location information of the specified location and a reference UE information where in the UEs moving in or moving out to be monitored, and wherein the reference UE information comprises identity of the UE, location of the UE and the proximity range from the reference UE within which the UEs moving in or moving out to be monitored.

In one embodiment, the location area monitoring subscription response comprises a subscription status and a subscription identity.

In one embodiment, the location area monitoring notification response comprises a subscription identity, a list of identities of all V2X UEs who are currently present in the specified location area associated with the group, a list of V2X UEs either moved in to the specified location area or moved out of the specified location area associated with the group, a list of identities of the V2X UEs who moved in to the specified location area since previous location area monitoring notification, a list of identities of the V2X UEs who moved out to the specified location area since previous location area monitoring notification, and triggering event.

In one embodiment, the method further comprises: sending, by the VAL server, a location area monitoring subscription modify request to the location management server to modify the subscription for notification for the at least one V2X UE moving in or moving out of the specific location area associated with the group; receiving, by the VAL server, a location area monitoring subscription modify response from the location management server; and receiving, by the VAL server, a location area monitoring notification informing about a triggering event from the location management server based on the modified subscription, wherein the triggering event indicates one of moving in or moving out of the at least one V2X UE of the specific location area.

In one embodiment, the location area monitoring subscription modify request comprises an identity of the VAL server requesting for the subscription, information of the specific location area be monitored, a time between consecutive reports, an immediate report Indicator, and triggering events identifying when the VAL server sends the notification related to at least one of a time since last report, distance travelled by the at least one V2X UE and an age of the specific location and moving in or moving out of the at least one V2X UE of the specific location area associated with the group.

In one embodiment, the location area monitoring subscription modify response comprises a subscription status and a subscription identity.

According to another embodiment of the disclosure, a location management server for updating location-based group in a V2X network is provided. The location management server comprises: a memory; a processor; and a location-based group updating controller, communicatively coupled to the memory and the processor. The location-based group updating controller is configured to: receive a location information criteria for creating a group comprising a list of V2X UEs associated with a specific location area; receive a location area monitoring subscription request from a VAL server to subscribe for notification for at least one V2X UE moving in or moving out of the specific location area associated with the group, where the location area to monitor can be static or dynamic; authorize the VAL server; send a location area monitoring subscription response to the VAL server in response to successful authorization of the VAL server; detect at least one V2X UE moving in or moving out of the specific location area associated with the group based on the subscription; and send a location area monitoring notification to the VAL server including the triggering event and information about the at least one V2X UE moving in or moving out of the specific location area associated with the group.

In one embodiment, sending the location area monitoring notification to the VAL server comprises: detecting a triggering event based on at least one of a predefined time period and a distance travelled by the at least one V2X UE, wherein the triggering event indicates one of a time since last report, distance travelled by the reference UE, an age of the location information stored at the location management server or moving in or moving out of the at least one V2X UE of the specific location area, based on a current location data and time stamp of the location of the at least one V2X UE; and sending the location area monitoring notification to the VAL server based on detection of the triggering event.

In one embodiment, the location information criteria comprise at least one of geographic location information of the specified location and a reference UE information wherein the UEs moving in or moving out to be monitored, and wherein the reference UE information comprises identity of the UE, location of the UE and the proximity range from the reference UE within which the UEs moving in or moving out to be monitored.

In one embodiment, the location area monitoring subscription request comprises an identity of the VAL server requesting for the subscription, information of the specific location area be monitored, a time between consecutive reports, an immediate report indicator, and triggering events identifying when the VAL server sends the notification related to at least one of a distance travelled by the at least one V2X UE and an age of the specific location area.

In one embodiment, the information of the specific location area comprises at least one of geographic location information of the specified location and a reference UE information wherein the UEs moving in or moving out to be monitored, and wherein the reference UE information comprises identity of the UE, location of the UE and the proximity range from the reference UE within which the UEs moving in or moving out to be monitored.

In one embodiment, the location area monitoring subscription response comprises a subscription status and a subscription identity.

In one embodiment, the location area monitoring notification response comprises a subscription identity, a list of identities of all V2X UEs who are currently present in the specified location area associated with the group, a list of V2X UEs either moved in to the specified location area or moved out of the specified location area associated with the group, a list of identities of the V2X UEs who moved in to the specified location area since previous location area monitoring notification, a list of identities of the V2X UEs who moved out of the specified location area since previous location area monitoring notification, and the triggering event.

In one embodiment, the location-based group updating controller is further configured to: receive a location area monitoring subscription modify request from the VAL server to modify the subscription for notification for at least one V2X UE moving in or moving out of the specific location area associated with the group; authorize the VAL server; send a location area monitoring subscription modify response to the VAL server in response to successful authorization of the VAL server; detect a triggering event indicating one of moving in or moving out of the at least one V2X UE of the specific location area based on the modified subscription; and send a location area monitoring notification informing about the triggering event to the VAL server.

In one embodiment, the location area monitoring subscription modify request comprises an identity of the VAL server requesting for the subscription, information of the specific location area be monitored, a time between consecutive reports, an immediate report Indicator, and triggering events identifying when the VAL server sends the notification related to at least one of a time since last report, distance travelled by the at least one V2X UE, an age of the specific location information and moving in or moving out of the at least one V2X UE of the specific location area associated with the group.

In one embodiment, the location area monitoring subscription modify response comprises a subscription status and a subscription identity.

According to another embodiment of the disclosure, a VAL server for updating location-based group in a V2X network is provided. The VAL server comprises: a memory; a processor; and a location-based group updating controller, communicatively coupled to the memory and the processor. The location-based group updating controller is configured to: send a location information criteria for creating a group comprising a list of V2X UEs associated with a specific location area; send a location area monitoring subscription request to the location management server to subscribe for notification for at least one V2X UE moving in or moving out of the specific location area associated with the group, where the location area to monitor can be static or dynamic; receive a location area monitoring subscription response from the location management server; and receive a location area monitoring notification informing about a triggering event from the location management server based on the subscription, wherein the triggering event indicates one of moving in or moving out of the at least one V2X UE of the specific location area associated with the group.

In one embodiment, the location information criteria comprise at least one of geographic location information of the specified location and a reference UE information, wherein the UEs moving in or moving out to be monitored, and wherein the reference UE information comprises identity of the UE, location of the UE and the proximity range from the reference UE within which the UEs moving in or moving out to be monitored.

In one embodiment, the location area monitoring subscription request comprises an identity of the VAL server requesting for the subscription, information of the specific location area be monitored, a time between consecutive reports, an immediate report indicator, and triggering events identifying when the VAL server sends the notification related to at least one of a distance travelled by the at least one V2X UE and an age of the specific location area associated with the group.

In one embodiment, the information of the specific location area comprises at least one of geographic location information of the specified location and a reference UE information where in the UEs moving in or moving out to be monitored, and wherein the reference UE information comprises identity of the UE, location of the UE and the proximity range from the reference UE within which the UEs moving in or moving out to be monitored.

In one embodiment, the location area monitoring subscription response comprises a subscription status and a subscription identity.

In one embodiment, the location area monitoring notification response comprises a subscription identity, a list of identities of all V2X UEs who are currently present in the specified location area associated with the group, a list of V2X UEs either moved in to the specified location area or moved out of the specified location area associated with the group, a list of identities of the V2X UEs who moved in to the specified location area since previous location area monitoring notification, a list of identities of the V2X UEs who moved out to the specified location area since previous location area monitoring notification, and triggering event.

In one embodiment, the location-based group updating controller is further configured to: send a location area monitoring subscription modify request to the location management server to modify the subscription for notification for the at least one V2X UE moving in or moving out of the specific location area associated with the group; receive a location area monitoring subscription modify response from the location management server; and receive a location area monitoring notification informing about a triggering event from the location management server based on the modified subscription, wherein the triggering event indicates one of moving in or moving out of the at least one V2X UE of the specific location area.

In one embodiment, the location area monitoring subscription modify request comprises an identity of the VAL server requesting for the subscription, information of the specific location area be monitored, a time between consecutive reports, an immediate report Indicator, and triggering events identifying when the VAL server sends the notification related to at least one of a time since last report, distance travelled by the at least one V2X UE and an age of the specific location and moving in or moving out of the at least one V2X UE of the specific location area associated with the group.

In one embodiment, the location area monitoring subscription modify response comprises a subscription status and a subscription identity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

In V2X communication, different entities (like vehicle, Road Side Unit (RSU), application server, pedestrians or the like) exchange their own status information, such as position, speed and heading, with other nearby vehicles, infrastructure nodes and/or pedestrians. The V2X applications can use "co-operative awareness" to provide more intelligent services for end-users. The V2X applications referred to as Vehicle-to-Everything (V2X), contain the following four different types:
 a. Vehicle-to-Vehicle (V2V),
 b. Vehicle-to-Infrastructure (V2I),
 c. Vehicle-to-Network (V2N),
 d. Vehicle-to-Pedestrian (V2P).

The advancement to fifth generation (5G) technologies facilitates many use cases in the V2X communications such as Forward Collision Warning, Cooperative Adaptive Cruise Control, etc. There are use cases related to V2X Road safety service via infrastructure, automated cooperative driving for short distance grouping and Cooperative lane change (CLC) of automated vehicles where it is required for a User Equipment (UE) (vehicle) to know all UEs within specific location area. Further, the V2X UE/server also needs to know list of UEs moving in or moving out of the specific area, where the area can change dynamically based on movement of the reference UE.

Thus, it is desired to address the above mentioned disadvantages or other shortcomings or at least provide a useful alternative.

The principal object of the embodiments herein is to provide a system and methods for updating location-based group in a V2X network. In the proposed method, a VAL server subscribes to a location management server for a list of vehicles moving in or moving out of the specific location area, where location area can be static or dynamic. The location management server monitors a location area and notifies list of UEs (vehicles) moving in or moving out of the specific location area, and group management server updates the group. The VAL server updates or unsubscribes on the location management server for the list of vehicles moving in or moving out of the specific location area.

In V2X, there are use cases related to a V2X Road safety service via infrastructure, automated cooperative driving for short distance grouping CLC of automated vehicles where it is required for the UE (vehicle) to know all UEs within specific location area. Further, the V2X UE/server also needs to know the list of UEs moving in or moving out of the specific location area. There exists a procedure in 3GPP TS 23.434 to get list of UEs from a given location area. However, there is no procedure using which the requesting V2X UE/server can receive the list of UEs moving in or out of the particular location area. The proposed method provides a method to subscribe for information of the UEs moving in or moving out of a location area information, where the location area information could be static or dynamic, for example, determining UEs in a given proximity range of a moving vehicle/UE, like so.

In V2X communication, there are use cases related to the V2X Road safety service via infrastructure, where infrastructure nodes such as RSUs and the traffic safety servers, generate and distribute the traffic safety-related messages for road safety. In such scenarios, the RSUs need to know the information about all the UEs who are moving in or out of the area which the particular RSU serves (static location area). The location/area information is static in this use case and the UEs/Vehicles movement within the given area is dynamic in nature, due to vehicles movement.

Another use case is related to V2X is Cooperative lane change (CLC) of automated vehicles, which involves vehicles exchanging their intended trajectories to coordinate their lateral (steering) and longitudinal controls (acceleration/deceleration) to ensure a smooth maneuver. In this use case, to exchange the information, the vehicle needs to know information about other vehicles/UEs which are moving in or out of the location area within proximity of another vehicle/UE (dynamic location area as vehicle/UE is moving) which is a moving target. Due to moving target, both the location/area information and the UEs to be monitored are dynamic.

Another use case is related to Automated cooperative driving for short distance grouping, to allow lane changing, merging, and passing between vehicles of the group and inclusion/removal of vehicle in the group in order to improved safety and fuel economy. In this use case, to include or remove the vehicles in the group, it is required to know vehicles which are moving in or out of the specific area.

Currently, based on the periodic reporting of list of UEs in a given location, the requesting V2X UE/server needs to determine the list of UEs moving in or out of the particular area. In certain scenarios, at some locations, when the vehicle/UE density is more, and the movement of the UEs within or out of location is less, then it is a data intensive operation to periodically report list of the all the UEs in the given location and at a given point of time.

Referring now to the drawings and more particularly to FIGS. 1, 2A to 2C, and 3 to 9, where similar reference characters denote corresponding features consistently throughout the figures, there are shown preferred embodiments.

FIG. 1 illustrates location based group creation according to the related art.

Referring to the FIG. 1, a method may include the following operations:

1-1. A group management client (100) or a vertical application layer (VAL) server (200) requests a location-based group create operation to a group management server (300). The location criteria for determining the identities of the users or UEs to be combined shall be included in this message.

1-2. The group management server (300) requests a location management server (400) for obtaining the users or UEs corresponding to the location information.

1-3. The location management server (400) composes the list of users or UEs within the requested location.

1-4. The group management server (300) receives the composed list of users or UEs from the location management server (400).

1-5. During the group creation, the group management server (300) creates and stores the information of the location-based group. The group management server (300) performs the check on the policies e.g. maximum limit of the total number of VAL group members for the VAL group(s).

1-6. The group management server (300) provides a location-based group creation response to the group management client (100) or the VAL server (200).

As shown in the procedure operations 1-2 to 1-4 of FIG. 1, the group management client requests the list of UEs in a particular area for one-time formation of a group. However, this procedure does not update the list of group members based on dynamic information e.g. the UEs moving in or moving out of the specified area with respect to a reference, where the location area to monitor can be static or dynamic. Hence real time update of the information associated to location based group is not possible in the conventional method.

Figure 2A:
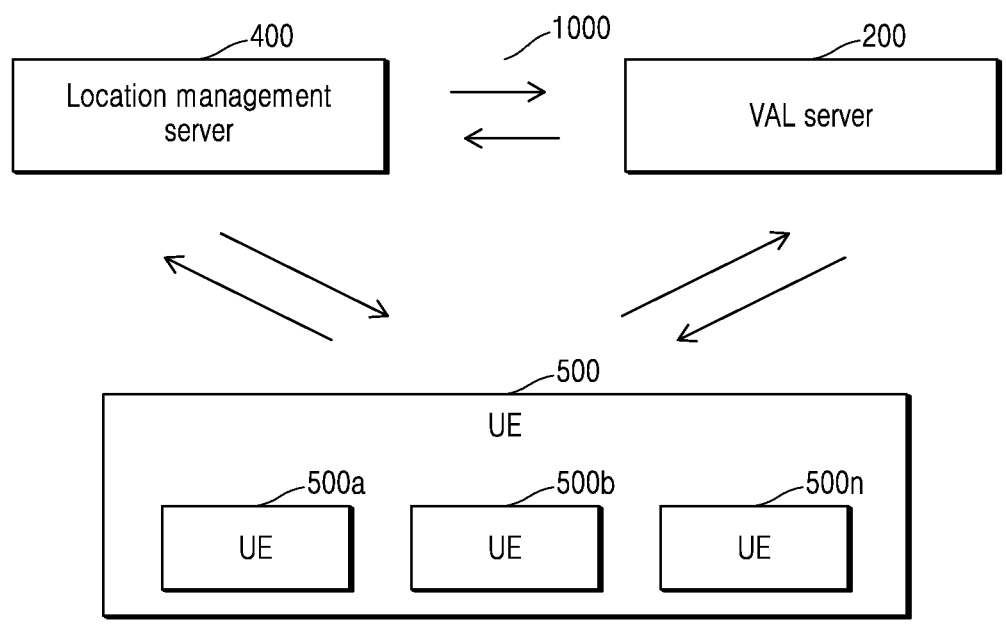
FIG. 2A illustrates a V2X network for updating location-based group, according to an embodiment of the disclosure.

FIG. 2A illustrates a V2X network for updating location-based group, according to an embodiment of the disclosure. In an embodiment, a V2X network includes a VAL server, a location management server, and V2X UEs.

Referring to FIG. 2A, a VAL server (200) sends in a V2X network (1000) a location information criteria for creating a group comprising a list of V2X UEs (500) associated with a specific location area. The location information criteria comprise at least one of geographic location information of the specified location and a reference UE information, where the UEs moving in or moving out to be monitored, and where the reference UE information comprises identity of the UE, location of the UE and the proximity range from the reference UE within which the UEs moving in or moving out to be monitored. The location management server (400) receives the location information criteria for creating the group comprising the list of V2X UEs (500) including, for example, UE (500a), UE (500b) . . . UE (500n), associated with the specific location area.

The VAL server (200) sends a location area monitoring subscription request to the location management server (400) to subscribe for notification for at least one V2X UE moving in or moving out of the specific location area associated with the group, where the location area to monitor can be static or dynamic. The location area monitoring subscription request comprises an identity of the VAL server (200) requesting for the subscription, information of the specific location area be monitored, a time between consecutive reports, an immediate report indicator, and triggering events identifying when the VAL server (200) sends the notification related to at least one of a distance travelled by the at least one V2X UE and an age of the specific location area. The information of the specific location area comprises at least one of geographic location information of the specified location and a reference UE information wherein the UEs moving in or moving out to be monitored. The reference UE information comprises identity of the UE, location of the UE and the proximity range from the reference UE within which the UEs moving in or moving out to be monitored. Further, the location management server (400) receives the location area monitoring subscription request from the VAL server (200) to subscribe for notification for at least one V2X UE moving in or moving out of the specific location area associated with the group.

Further, the location management server (400) sends a location area monitoring subscription response to the VAL server (200) in response to successful authorization of the VAL server (200). The location area monitoring subscription response comprises a subscription status and a subscription identity.

Further, the location management server (400) detects at least one V2X UE moving in or moving out of the specific location area associated with the group based on the subscription. Further, the location management server (400) sends a location area monitoring notification to the VAL server including the triggering event and information about the at least one V2X UE moving in or moving out of the specific location area associated with the group.

In an embodiment, the location management server (400) detects a triggering event based on at least one of a predefined time period and a distance travelled by the at least one V2X UE. The triggering event indicates one of a time since last report, distance travelled by the reference UE, an age of the location information stored at the location management server (400) or moving in or moving out of the at least one V2X UE of the specific location area, based on a current location data and time stamp of the location of the at least one V2X UE. Further, the location management server (400) sends the location area monitoring notification to the VAL server (200) based on detection of the triggering event. The location area monitoring subscription response comprises a subscription identity, a list of identities of all V2X UEs who are currently present in the specified location area associated with the group, a list of V2X UEs either moved in to the specified location area or moved out of the specified location area associated with the group, a list of identities of the V2X UEs who moved in to the specified location area since previous location area monitoring notification, a list of identities of the V2X UEs who moved out of the specified location area since previous location area monitoring notification, and the triggering event.

The VAL server (200) sends a location area monitoring subscription modify request to the location management server (400) to modify the subscription for notification for the at least one V2X UE moving in or moving out of the specific location area associated with the group. The location area monitoring subscription modify request comprises an identity of the VAL server (200) requesting for the subscription, information of the specific location area be monitored, a time between consecutive reports, an immediate report indicator, and triggering events identifying when the VAL server (200) sends the notification related to at least one of a time since last report, distance travelled by the at least one V2X UE, an age of the specific location information and moving in or moving out of the at least one V2X UE of the specific location area associated with the group. Further, the location management server (400) receives a location area monitoring subscription modify request from the VAL server (200) to modify the subscription for notification for at least one V2X UE moving in or moving out of the specific location area associated with the group.

Further, the location management server (400) sends a location area monitoring subscription modify response to the VAL server (200) in response to successful authorization of the VAL server (200). The location area monitoring subscription modify response comprises a subscription status and a subscription identity.

Further, the location management server (400) detects a triggering event indicating one of moving in or moving out of the at least one V2X UE of the specific location area based on the modified subscription. Further, the location management server (400) sends a location area monitoring notification informing about the triggering event to the VAL server (200).

Figure 2B:
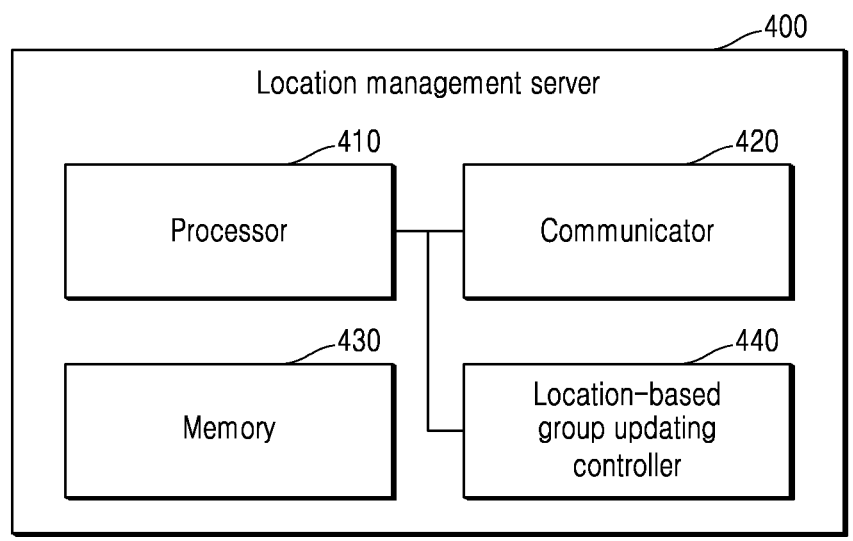
FIG. 2B shows various hardware components of a location management server, according to an embodiment of the disclosure.

FIG. 2B shows various hardware components of a location management server, according to an embodiment of the disclosure. In an embodiment, the location management server (400) may include a processor (410), a communicator (420), a memory (430) and a location-based group updating controller (440). The processor (410) is coupled with the communicator (420), the memory (430) and the location-based group updating controller (440).

Referring to FIG. 2B, a location-based group updating controller (440) receives the location information criteria for creating the group comprising a list of V2X UEs (500) associated with the specific location area. Further, the location-based group updating controller (440) receives the location area monitoring subscription request from the VAL server (200) to subscribe for notification for the at least one V2X UE moving in or moving out of the specific location area associated with the group, where the location area to monitor can be static or dynamic. Further, the location-based group updating controller (440) sends the location area monitoring subscription response to the VAL server (200) in response to successful authorization of the VAL server (200). Further, the location-based group updating controller (440) detects the at least one V2X UE moving in or moving out of the specific location area associated with the group based on the subscription. Further, the location-based group updating controller (440) sends the location area monitoring notification to the VAL server including the triggering event and information about the at least one V2X UE moving in or moving out of the specific location area associated with the group.

In an embodiment, the location-based group updating controller (440) detects the triggering event based on at least one of the predefined time period and the distance travelled by the at least one V2X UE, where the triggering event indicates one of a time since last report, distance travelled by the reference UE, the age of the location information stored at the location management server (400) or moving in or moving out of the at least one V2X UE of the specific location area, based on a current location data and time stamp of the location of the at least one V2X UE. Further, the location-based group updating controller (440) sends the location area monitoring notification to the VAL server (200) based on detection of the triggering event.

Further, the location-based group updating controller (440) receives the location area monitoring subscription modify request from the VAL server (200) to modify the subscription for notification for at least one V2X UE moving in or moving out of the specific location area associated with the group. Further, the location-based group updating controller (440) sends the location area monitoring subscription modify response to the VAL server (200) in response to successful authorization of the VAL server (200). Further, the location-based group updating controller (440) detects the triggering event indicating one of moving in or moving out of the at least one V2X UE of the specific location area based on the modified subscription. Further, the location-based group updating controller (440) sends the location area monitoring notification informing about the triggering event to the VAL server (200).

The location-based group updating controller (440) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in Random Access Memory (RAM) or cache).

Although FIG. 2B shows various hardware components of the location management server (400) but it is to be understood that other embodiments are not limited thereon. In other embodiments, the location management server (400) may include less or more number of components. Further, the labels or names of the components are used only for illustrative purpose and does not limit the scope of the disclosure. One or more components can be combined together to perform same or substantially similar function in the location management server (400).

Figure 2C:
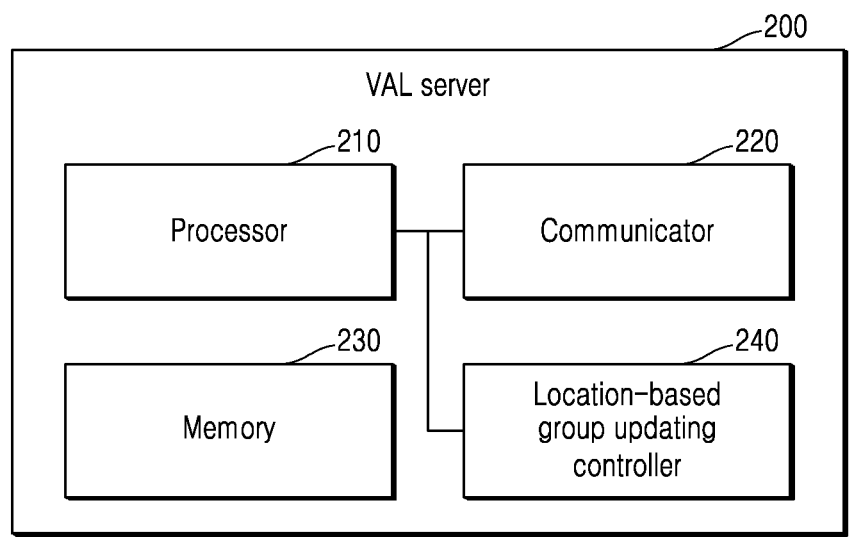
FIG. 2C shows various hardware components of a VAL server, according to an embodiment of the disclosure.

FIG. 2C shows various hardware components of a VAL server, according to an embodiment of the disclosure. In an embodiment, the VAL server (200) may include a processor (210), a communicator (220), a memory (230), and a location-based group updating controller (240). The processor (210) is coupled with the communicator (220), the memory (230) and the location-based group updating controller (240).

Referring to FIG. 2C, the location-based group updating controller (240) sends the location information criteria for creating the group comprising the list of V2X UEs (500) associated with the specific location area. Further, the location-based group updating controller (240) sends the location area monitoring subscription request to the location management server (400) to subscribe for notification for at least one V2X UE moving in or moving out of the specific location area associated with the group, where the location area to monitor can be static or dynamic. Further, the location-based group updating controller (240) receives the location area monitoring subscription response from the location management server (400). Further, the location-based group updating controller (240) receives the location area monitoring notification informing about the triggering event from the location management server (400) based on the subscription. The triggering event indicates one of moving in or moving out of the at least one V2X UE of the specific location area associated with the group.

Further, the location-based group updating controller (240) sends the location area monitoring subscription modify request to the location management server (400) to modify the subscription for notification for the at least one V2X UE moving in or moving out of the specific location area associated with the group. Further, the location-based group updating controller (240) receives the location area monitoring subscription modify response from the location management server (400). Further, the location-based group updating controller (240) receives the location area monitoring notification informing about the triggering event from the location management server (400) based on the modified subscription. The triggering event indicates one of moving in or moving out of the at least one V2X UE of the specific location area.

The location-based group updating controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 2C shows various hardware components of the VAL server (200) but it is to be understood that other embodiments are not limited thereon. In other embodiments, the VAL server (200) may include less or more number of components. Further, the labels or names of the components are used only for illustrative purpose and does not limit the scope of the disclosure. One or more components can be combined together to perform same or substantially similar function in the VAL server (200).

FIG. 3 is a flow chart illustrating a method, implemented by a location management server, for updating location-based group in a V2X network, according to an embodiment of the disclosure. The operations of FIG. 3 are handled by the location-based group updating controller (440).

Referring to FIG. 3, in flowchart S300, the method includes, at operation S302, receiving the location information criteria for creating the group comprising the list of V2X UEs (500) associated with the specific location area. At operation S304, the method includes receiving the location area monitoring subscription request from the VAL server (200) to subscribe for notification for the at least one V2X UE moving in or moving out of the specific location area associated with the group, where the location area to monitor can be static or dynamic. At operation S306, the method includes authorizing the VAL server (200). At operation S308, the method includes sending the location area monitoring subscription response to the VAL server (200) in response to successful authorization of the VAL server (200). At operation S310, the method includes detecting the V2X UE moving in or moving out of the specific location area associated with the group based on the subscription. At operation S312, the method includes sending the location area monitoring notification to the VAL server including the triggering event and information about the at least one V2X UE moving in or moving out of the specific location area associated with the group.

At operation S314, the method includes receiving the location area monitoring subscription modify request from the VAL server (200) to modify the subscription for notification for at least one V2X UE moving in or moving out of the specific location area associated with the group. At operation S316, the method includes authorizing the VAL server (200). At operation S318, the method includes sending the location area monitoring subscription modify response to the VAL server (200) in response to successful authorization of the VAL server (200).

FIG. 4 is a flow chart illustrating a method, implemented by a VAL server, for updating location-based group in a V2X network, according to an embodiment of the disclosure. The operations of FIG. 4 are handled by the location-based group updating controller (240).

Referring to FIG. 4, in flowchart (S400) the method includes, at operation S402, sending the location information criteria for creating the group comprising the list of V2X UEs associated with the specific location area. At operation S404, the method includes sending the location area monitoring subscription request to the location management server (400) to subscribe for notification for the V2X UE moving in or moving out of the specific location area associated with the group. At operation S406, the method includes receiving the location area monitoring subscription response from the location management server (400). At operation S408, the method includes receiving the location area monitoring notification informing about the triggering event and information about the at least one V2X UE moving in or moving out of the specific location area associated with the group from the location management server (400) based on the subscription.

At operation S410, the method includes sending the location area monitoring subscription modify request to the location management server (400) to modify the subscription for notification for the V2X UE moving in or moving out of the specific area associated with the group. At operation S412, the method includes receiving the location area monitoring subscription modify response from the location management server (400).

Figure 5:
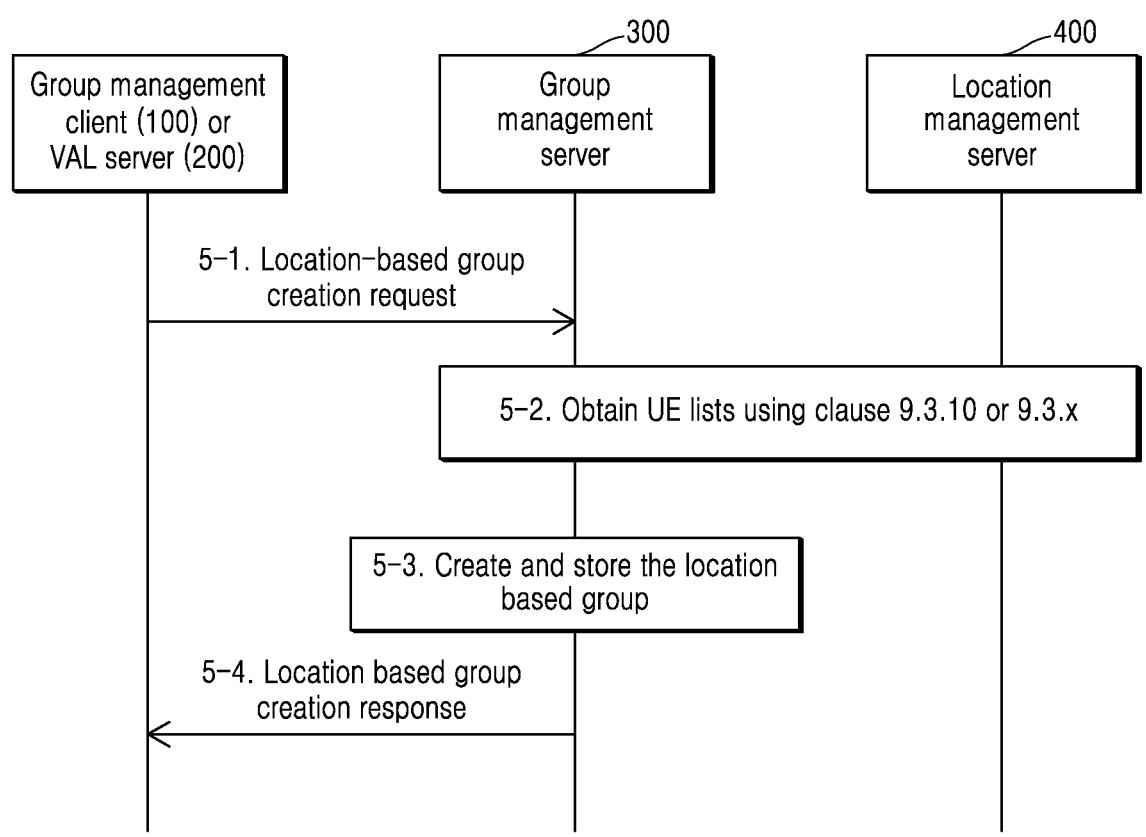
FIG. 5 illustrates a location-based group creation, according to an embodiment of the disclosure.

FIG. 5 illustrates a location-based group creation, according to an embodiment of the disclosure. Unlike to the conventional methods and systems, consider a proposed method, including the following operations.

Referring to the FIG. 5, a method may including the following operations:

5-1. The group management client (100) or the VAL server (200) requests location-based group create operation to the group management server (300). The location criteria for determining the identities of the member users or UEs of the location based group shall be included in this message. The location information criteria may include the geographic location information where the UEs moving in or moving out to be monitored, or it may include reference UE information where in the UEs moving in or moving out of given proximity range from the reference UE to be monitored. Reference UE is the target UE, surrounding which the UEs move in and move out need to be monitored. In an embodiment, the reference UE information may include VAL UE identifier (ID), External Identifier of the UE, generic public subscription identifier (GPSI), mobile station integrated services digital network (MSISDN), like so.

5-2. The group management server (300) requests the location management server (400) for obtaining the users or UEs corresponding to the location information as specified in clause 9.3.10 of TS 23.434 or subscribes to the list of UEs moving in or out of the area as specified in clause 9.3.12 of TS 23.434 (which is a new service of location management server (400) that reports the list of UEs moving in or out of the given location to the subscriber).

5-3. During the group creation, the group management server (300) creates and stores the information of the location-based group. The group management server (300) performs the check on the policies e.g. maximum limit of the total number of VAL group members for the VAL group(s).

5-4. The group management server (300) provides a location-based group creation response to the group management client (100) or the VAL server (200).

Upon receiving further notifications from the location management server (400) with the list of UEs moving in or moving out of the area, the group management server (300) updates (adds or removes) the group members of the location based group and sends group membership notification as specified in the clause 10.3.5.1 of TS 23.434.

If the group management server (300) receives request to delete the location based group, the group management server (300) performs unsubscribe procedure as specified in clause 9.3.12.3 (new service of location management server (400) that deletes the subscription to reporting of UEs moving in and out of a given location), if subscription is still active.

Figure 6:
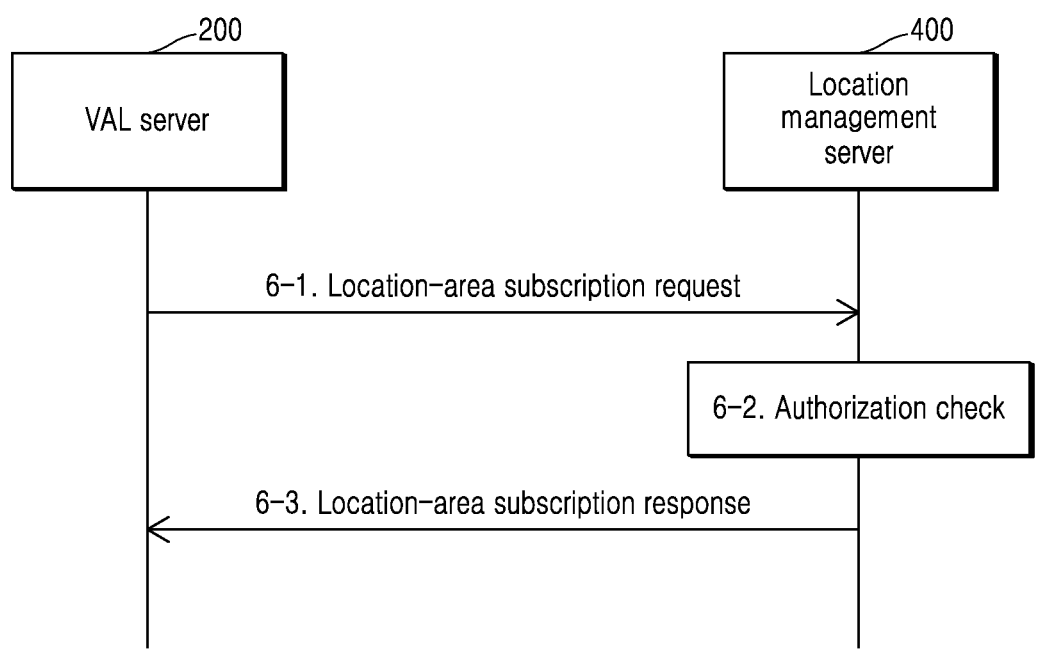
FIG. 6 illustrates a proposed location area information subscription procedure, according to an embodiment of the disclosure.

FIG. 6 illustrates a proposed location area information subscription procedure, according to an embodiment of the disclosure.

Referring to the FIG. 6 consider a proposed method, which illustrates the high level procedure of location area subscription request. The same procedure can be applied for location management client and other service enabler architecture layer (SEAL) servers that would like to subscribe to the list of UEs moving in or moving out of the specific location area. The subscribe request can be for own reference UE or any other reference UE for which the subscriber is authorized to monitor location information.

Referring to the FIG. 6, a method may including the following operations:

6-1. The VAL server (200) sends a location area subscription request to the location management server (400) to subscribe to the list of UEs moving in or moving out of the specific location area. In the request message, the VAL server (200) includes the information as specified in Table 1 below. The location information criteria may include the geographic location information where the UEs moving in or moving out to be monitored, or it may include reference UE information where in the UEs moving in or moving out of given proximity range from the reference UE to be monitored. Reference UE is the target UE, surrounding which the UEs move in and move out need to be monitored. In an embodiment, the reference UE information may include VAL UE ID, External Identifier of the UE, GPSI, MSISDN, like so.

6-2. The location management server (400) shall check if the VAL server (200) is authorized to initiate the location area subscription request.

6-3. The location management server (400) replies with the location area subscription response indicating the subscription status. In the response message, the location management server (400) includes the information as specified in Table 2 below.

The location management server (400) exposes the service as API by adding new location management related event in the list of SEAL Event data type for the "eventId" attribute of the SS_Events API.

In another embodiment, the VAL server (200) configures the location management server (400) to report list of UEs on specific event (like distance covered by the moving UE).

The Table 1 describes the information flow from the VAL server (200) to the location management server (400) for location area subscription request.

TABLE 1

Location information subscription request

| Information element | Status | Description |
| --- | --- | --- |
| Location Information criteria | Mandatory | Location information (e.g. current location of the VAL UE with proximity range, geographic area, etc) |
| Reference UE | Optional | VAL UE which is the reference UE for the proximity range |
| Proximity range | Optional | Proximity range within which the UEs will be monitored |
| Geographic area | Optional | Geographic area to be monitored |
| Time between consecutive reports | Mandatory | It indicates the interval time between consecutive reports |
| Triggering events | Optional | Identifies when the server will send the notification (e.g. distance travelled, age of the location, etc) |

The Table 2 describes the information flow from the location management server (400) to the VAL server (200) for location area subscription response.

TABLE 2

Location area subscription response

| Information element | Status | Description |
| --- | --- | --- |
| Subscription status | Mandatory | It indicates the subscription result |
| Subscription identity | Optional | If subscription is successful, identifies the subscription |

Figure 7:
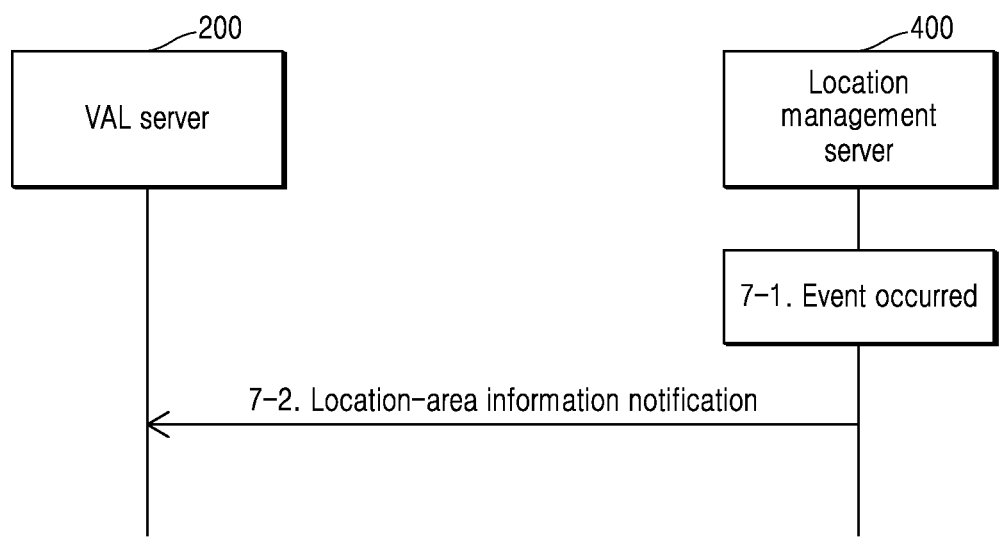
FIG. 7 illustrates a proposed location area information notification procedure, according to an embodiment of the disclosure.

FIG. 7 illustrates a proposed location area information notification procedure, according to an embodiment of the disclosure.

Referring to the FIG. 7 consider a proposed method, which illustrates the high level procedure of location area information notification. The same procedure can be applied for location management client and other SEAL servers who have subscribe to the list of the UEs moving in or moving out of the specific location area.

Referring to the FIG. 7, a method may include the following operations:

7-1. One of the event occurs at the location management server (400) as specified in the subscribe request. The location management server (400) identifies the UEs which are moved into the area or moved out of the area based on the location data and time stamp of the location. The location management server (400) also determines that the age of the location of the UEs is not more than the age value specified in the subscribe request, if available. The location management server (400) may report the list of all UEs in the given location or UEs moved in and moved out from the last reported UEs list. The location management server (400) may decide to do the differential reporting (UEs moved in and out) based on criteria, if requested from subscriber.

7-2. The location management server (400) sends a location area information notification to the VAL server (200). In the notification message, the location management server (400) includes the information as specified in Table 3 below.

The Table 3 describes the information flow from the location management server (400) to the VAL server (200).

TABLE 3

| Information element | Status | Description |
| --- | --- | --- |
| Subscription identity | Mandatory | Identity of the subscription |
| UEs currently present | Optional | List of the identities of all VAL UEs who are currently present in the given location area |
| UEs moved in/out | Optional | List of UEs either moved in to the location area or moved out of the location area |
| >UEs moved in | Optional | List of the identities of the VAL UEs who moved in to the given location area since previous notification. |
| >UEs moved out | Optional | List of the identities of the VAL UEs who moved out of the given location area since previous notification. |
| Triggering event | Optional | Identity of the event that triggered the sending of the notification |

Figure 8:
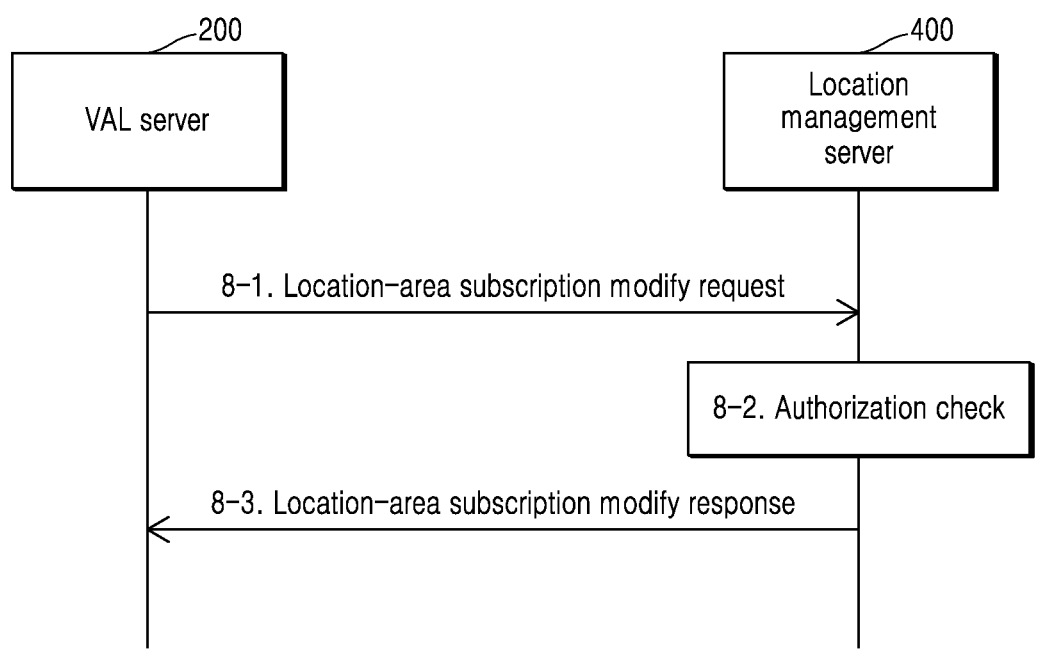
FIG. 8 illustrates a proposed location area information subscription modify procedure, according to an embodiment of the disclosure.

FIG. 8 illustrates a proposed location area information subscription modify procedure, according to an embodiment of the disclosure.

Referring to the FIG. 8 consider a proposed method, which illustrates the high level procedure of location area subscribe modify request. The same procedure can be applied for location management client and other SEAL servers that would like to modify the subscription to the list of UEs moving in or moving out of the specific location area. The subscribe modify request can be for own reference UE or any other reference UE for which the subscriber is authorized to monitor location information.

Referring to the FIG. 8, a method may include the following operations:

8-1. The VAL server (200) sends a location area subscription modify request to the location management server (400) to modify the subscription to the list of UEs moving in or moving out of the specific location area. In the request message, the VAL server (200) includes the information as specified in Table 4 below.

8-2. The location management server (400) shall check if the VAL server (200) is authorized to initiate the location area subscription request.

8-3. The location management server (400) replies with a location area subscription response indicating the subscription status. In the response message, the location management server includes the information as specified in Table 5 below.

The Table 4 describes the information flow from the VAL server (200) to the location management server (400) for location area subscription modify request.

TABLE 4

Location information subscription modify request

| Information element | Status | Description |
| --- | --- | --- |
| Subscription identity | Mandatory | Identifies the subscription |
| Location Information | Mandatory | Location information |
| Time between consecutive reports | Optional | It indicates the interval time between consecutive reports |
| Triggering events | Optional | Identifies when the server will send the notification |

The Table 5 describes the information flow from the location management server (400) to the VAL server (200) for location area subscriptions modify response.

TABLE 5

| Location area subscription modify response | | |
| --- | --- | --- |
| Information element | Status | Description |
| Subscription status | Mandatory | It indicates the request result |

Figure 9:
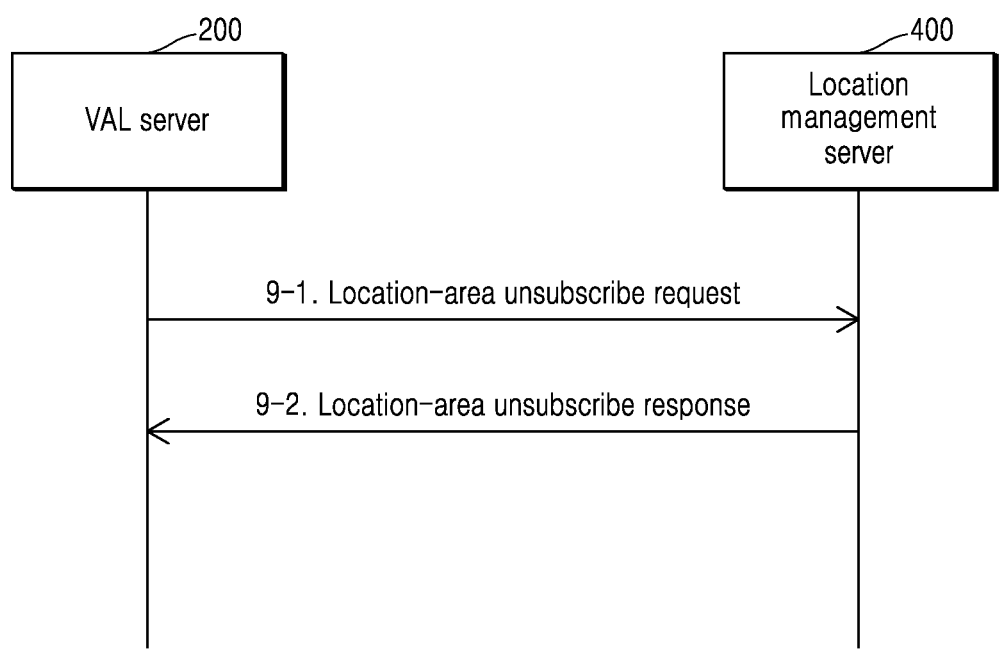
FIG. 9 illustrates a proposed location area information unsubscribe procedure, according to an embodiment of the disclosure.

FIG. 9 illustrates a proposed location area information unsubscribe procedure, according to an embodiment of the disclosure.

Referring to the FIG. 9 consider a proposed method, which illustrates the high level procedure of location area unsubscribe request. The same procedure can be applied for location management client and other SEAL servers that would like to unsubscribe to the list of UEs moving in or moving out of the specific location area. The unsubscribe request can be for own reference UE or any other reference UE for which the subscriber is authorized to monitor location information.

Referring to the FIG. 9, a method may include the following operations:

9-1. The VAL server (200) sends a location area unsubscribe request to the location management server (400) to modify the subscription to the list of UEs moving in or moving out of the specific location area. In the request message, the VAL server (200) includes the information as specified in Table 6.

9-2. The location management server (400) replies with a location area unsubscribe response indicating the subscription status. In the response message, the location management server (400) includes the information as specified in Table 7.

The Table 6 describes the information flow from the VAL server (200) to the location management server (400) for location area unsubscribe request.

TABLE 6

| Location information unsubscribe request | | |
| --- | --- | --- |
| Information element | Status | Description |
| Subscription identity | Mandatory | Identifies the subscription |

The Table 7 describes the information flow from the location management server (400) to the VAL server (200) for location area unsubscribe response.

TABLE 7

| Location area unsubscribe response | | |
| --- | --- | --- |
| Information element | Status | Description |
| Subscription status | Mandatory | It indicates the request result |

The various actions, acts, blocks, operations, or the like in the flow charts (S300 and S400) may be performed in the order presented, in a different order or simultaneously. Further, in some embodiments, some of the actions, acts, blocks, operations, or the like may be omitted, added, modified, skipped, or the like without departing from the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a location management server for updating a location-based group in a vehicle-to-everything (V2X) network, the method comprising:
receiving, from a vertical application layer (VAL) server, a location area monitoring subscription request for a subscription to a list of user equipments (UEs) moving into or moving out of a specific location area associated with a reference UE, wherein the location area monitoring subscription request includes reference UE information corresponding to the reference UE;
checking if the VAL server is authorized;
sending, to the VAL server, a location area monitoring subscription response including information indicating a subscription result;
identifying at least one V2X UE moving into or moving out of the specific location area by identifying the at least one V2X UE moving into or out of a proximity range from the reference UE; and
sending, to the VAL server, a location area monitoring notification including a subscription identity, a triggering event, and information about the at least one V2X UE moving into or moving out of the specific location area.

2. The method of claim 1, further comprising:
identifying the triggering event based on at least one of a predefined time period or a distance travelled by the at least one V2X UE, the triggering event indicating one of a time since last report, a distance travelled by the reference UE, an age of location information stored at the location management server, or the at least one V2X UE moving into or moving out of the specific location area, based on current location data and a time stamp of a location of the at least one V2X UE; and
sending, to the VAL server, the location area monitoring notification based on the identifying of the triggering event.

3. The method of claim 1, wherein the location area monitoring subscription request further includes location information criteria including geographic location information of the specific location area.

4. The method of claim 1, wherein the location area monitoring subscription request further includes at least one of information of the specific location area to be monitored, a time between consecutive reports, or triggering events identifying when the VAL server sends a notification.

5. The method of claim 1, wherein the reference UE information comprises identity information of the reference UE, a location of the reference UE, and the proximity range from the reference UE within which the UEs moving into or moving out of are monitored.

6. The method of claim 1, wherein the location area monitoring subscription response further includes a subscription identity.

7. The method of claim 1, wherein the location area monitoring notification further includes a list of identities of all V2X UEs who are currently present in the specific location area, a list of V2X UEs moving into or moving out of the specific location area, a list of identities of V2X UEs moving into the specific location area since a previous location area monitoring notification, and a list of identities of V2X UEs moving out of the specific location area since the previous location area monitoring notification.

8. The method of claim 1, further comprising:
   receiving, from the VAL server, a location area monitoring subscription modify request to modify the subscription for a list of UEs moving into or moving out of the specific location area;
   checking if the VAL server is authorized;
   sending, to the VAL server, a location area monitoring subscription modify response including information indicating a request result;
   identifying the triggering event indicating one of the at least one V2X UE moving into or moving out of the specific location area; and
   sending, to the VAL server, a location area monitoring notification including the triggering event.

9. The method of claim 8, wherein the location area monitoring subscription modify request comprises at least one of information of the specific location area to be monitored, a time between consecutive reports, or triggering events identifying when the VAL server sends a notification.

10. The method of claim 8, wherein the location area monitoring subscription modify response comprises a subscription status and a subscription identity.

11. A method performed by a vertical application layer (VAL) server for updating a location-based group in a vehicle-to-everything (V2X) network, the method comprising:
   sending, to a location management server, a location area monitoring subscription request for a subscription to a list of user equipments (UEs) moving into or moving out of a specific location area associated with a reference UE, wherein the location area monitoring subscription request includes reference UE information corresponding to the reference UE, wherein the specific location area corresponds to a proximity range from the reference UE;
   receiving, from the location management server, a location area monitoring subscription response including information indicating a subscription result; and
   receiving, from the location management server, a location area monitoring notification including a subscription identity, a triggering event, and information about at least one V2X UE moving into or moving out of the specific location area.

12. The method of the claim 11,
   wherein the method further comprises:
   sending, to the location management server, a location area monitoring subscription modify request to modify the subscription for a list of UEs moving into or moving out of the specific location area;
   receiving, from the location management server, a location area monitoring subscription modify response including information indicating a request result; and
   receiving, from the location management server, a location area monitoring notification including the triggering event, and wherein the triggering event indicates one of the at least one V2X UE moving into or moving out of the specific location area.

13. A location management server for updating a location-based group in a vehicle-to-everything (V2X) network, the location management server comprising:
   a memory;
   a processor; and
   a location-based group updating circuit, communicatively coupled to the memory and the processor, the location-based group updating circuit being configured to:
      receive, from a vertical application layer (VAL) server, a location area monitoring subscription request for a subscription to a list of user equipments (UEs) moving into or moving out of a specific location area associated with a reference UE, wherein the location area monitoring subscription request includes reference UE information corresponding to the reference UE,
      check if the VAL server is authorized,
      send, to the VAL server, a location area monitoring subscription response including information indicating a subscription result,
      identify at least one V2X UE moving into or moving out of the specific location area by identifying the at least one V2X UE moving into or out of a proximity range from the reference UE, and
      send, to the VAL server, a location area monitoring notification including a subscription identity, a triggering event, and information about the at least one V2X UE moving into or moving out of the specific location area.

14. The location management server of claim 13, wherein the location-based group updating circuit is further configured to:
   receive, from the VAL server, a location area monitoring subscription modify request to modify the subscription for a list of UEs moving into or moving out of the specific location area,
   check if the VAL server is authorized,
   send, to the VAL server, a location area monitoring subscription modify response including information indicating a request result,
   identify the triggering event indicating one of the at least one V2X UE moving into or moving out of the specific location area, and
   send, to the VAL server, a location area monitoring notification including the triggering event.

15. A vertical application layer (VAL) server for updating a location-based group in a vehicle-to-everything (V2X) network, the VAL server comprising:
   a memory;
   a processor; and
   a location-based group updating circuit, communicatively coupled to the memory and the processor, the location-based group updating circuit being configured to:
      send, to a location management server, a location area monitoring subscription request for a subscription to a list of user equipments (UEs) moving into or moving out of a specific location area associated with a reference UE, wherein the location area monitoring subscription request includes reference UE information corresponding to the reference UE, wherein the specific location area corresponds to a proximity range from the reference UE, receive, from the location management server, a location area monitoring subscription response including information indicating a subscription result, and receive, from the location management server, a location area monitoring notification including a subscription identity, a triggering event, and information about at least one V2X UE moving into or moving out of the specific location area.

16. The method of claim 1, wherein the reference UE is a target UE which UEs moving into or moving out of surrounding area need to be monitored.

* * * * *